United States Patent

Gray, Jr. et al.

[11] Patent Number: 5,579,640
[45] Date of Patent: Dec. 3, 1996

[54] ACCUMULATOR ENGINE

[75] Inventors: Charles L. Gray, Jr., Pinckney; Karl H. Hellman, Ann Arbor, both of Mich.

[73] Assignee: The United States of America as represented by the Administrator of the Environmental Protection Agency, Washington, D.C.

[21] Appl. No.: 429,616

[22] Filed: Apr. 27, 1995

[51] Int. Cl.⁶ .......................... F16D 31/02; F15B 21/04
[52] U.S. Cl. ................. 60/413; 60/597; 60/668; 91/4 R
[58] Field of Search ..................... 60/329, 396, 413, 60/414, 415, 416, 597, 668, 516, 650, 682; 91/4 R

[56] References Cited

U.S. PATENT DOCUMENTS

| | | | |
|---|---|---|---|
| 3,648,458 | 3/1972 | McAlister | 60/415 |
| 3,901,033 | 8/1975 | McAlister | 91/4 R X |
| 3,903,696 | 9/1975 | Carman | 60/414 |
| 4,016,719 | 4/1977 | Yavnai | 60/416 |
| 4,227,587 | 10/1980 | Carman | 60/414 X |
| 4,745,745 | 5/1988 | Hagin | 60/413 X |

FOREIGN PATENT DOCUMENTS 3828642  3/1989  Germany ........................ 60/416

Primary Examiner—Hoang Nguyen
Attorney, Agent, or Firm—Lorusso & Loud

[57] ABSTRACT

A hydropneumatic powertrain includes a fluidic driver connected in parallel with first and second liquid tanks connected, respectively, with first and second gas vessels. The gas within each gas vessel is in fluid communication with the liquid within the corresponding liquid vessel. A prime mover drives a pump to pump liquid alternately into one of the two liquid tanks connected in parallel with the pump. Switch valving directs the discharge of the pump to either the first liquid tank or the second liquid tank, while the liquid tank not receiving liquid from the pump discharge is discharging its liquid, driven by expansion of gas within the corresponding gas vessel, to drive the fluidic driver which, in turn, drives the drive wheels of the vehicle. Each gas tank is equipped with a heater and a cooler whereby the gas vessel, in the compression portion of the cycle, is cooled while the other gas vessel is heated for expansion of the gas contained therein. Thus, the fluidic driver can be continuously driven by alternating discharges from the two liquid tanks.

8 Claims, 2 Drawing Sheets ns11,579,640

ACCUMULATOR ENGINE

BACKGROUND OF THE INVENTION

1. Field of the Invention

The present invention relates to a pneumatic/hydraulic accumulator "heat engine", which may be used in hydraulic powertrains for vehicles, but is further useful with any source of heat to produce shaft work.

2. The Prior Art

Hydraulic accumulators typically operate over pressure ranges between about 1,000 psi and 5,000 psi or greater. Most of this pressure change is the result of the increase or decrease in the volume of the fluid from the liquid side of the accumulator, which alternately compresses and expands the gas side, thereby alternately storing and releasing energy. Heating and cooling of the gas side also occurs as a natural consequence of rapid compression and expansion, and has an additional effect on pressure. Reading FIG. 1 from the right, curve A shows the rate of pressure increase as it would have occurred had there been no temperature increase, i.e. an isothermal compression. Curve B shows the actual rate of pressure increase due to both volume compression and natural heating during a rapid compression. Since the area under the curves represents work performed, it can be seen that isothermal compression requires less input energy than rapid natural compression, although the pressure achieved, and thus the amount of energy stored, is smaller. However, before the gas in the vessel is expanded, any heat naturally generated by compression may be lost through the walls of the device. Since this heat was actually provided by the work performed in compressing the gas, it is lost work.

As the accumulator discharges, the pressure drops off very quickly as a result of (a) volume expansion, and (b) a drop in temperature, the reverse of the normal compression process. It would be more desirable to maintain the pressure as high as possible during expansion.

Conventional accumulators offer no means to improve the shape of the pressure curve because they cannot control the temperature change in the charge gas. The temperature change cannot be purposely controlled or harnessed in any way that would act to improve the specific energy storage capacity or other characteristics of the device. Instead, it is tolerated as a natural outcome of accumulator design and is worked around or ignored. For example, conventional accumulators do not allow isothermal compression and expansion in normal use, even though an isothermal process might lead to advantages in efficiency, specific energy storage capacity, pressure curve, and volume sizing considerations.

There have been investigations into the use of insulating foam materials in the gas side of an accumulator to contain heat and prevent its loss to the environment. While this technique has been shown to increase the efficiency of accumulators to dramatic levels (nearly 100%), it does not significantly increase the specific energy storage capacity of the accumulator, and does not significantly affect the shape of the pressure curve.

SUMMARY OF THE INVENTION

Accordingly, it is an object of the present invention to improve the practicality of hydraulic hybrid powertrains and thereby offer a large improvement in fuel utilization efficiency in passenger automobiles.

Another object of the present invention is to provide a new heat engine that can use any source of heat to produce shaft work, and that can be efficiently integrated into an automotive powertrain with improved fuel utilization efficiency and attendant reduction in generation of pollutants including greenhouse gases such as carbon dioxide.

In furtherance of the above-stated objectives, the present invention provides a new hydropneumatic heat engine which can be integrated into a unique vehicle powertrain for driving drive wheels of said vehicle which includes a fluidic drive unit for driving the drive wheels in a motor mode. In a preferred embodiment the fluidic drive unit is reversible for operation both in a motor mode and in a pump mode. The hydropneumatic powertrain of a preferred embodiment of the present invention further includes first and second liquid tanks connected in parallel with the fluidic drive unit for alternately discharging liquid to drive the fluidic drive unit and receiving liquid. The system further includes a prime mover and a pump driven by the prime mover for alternately pumping fluid into the first or second liquid tank and, accordingly, the first and second liquid tanks are connected in parallel with the pump. Switch valving directs the discharge of the pump to either the first liquid tank, while the second liquid tank is discharging through the fluidic drive unit into a reservoir and for charging the second liquid tank while the first liquid tank is discharging its liquid content through the fluidic drive unit into the reservoir. First and second gas vessels are connected, respectively, to the first and second liquid vessels and each contains a gas in fluid communication with liquid in its paired liquid vessel. Each gas vessel is provided with a heater and a cooler for alternately heating and cooling the gas within the vessels. A controller operates the coolers and the heaters in a manner whereby one gas vessel is being heated for gas expansion and displacement of liquid from its corresponding liquid vessel while the other gas vessel is being cooled to facilitate compression of the gas therein, driven by liquid within the corresponding, paired liquid vessel.

In a preferred embodiment the prime mover is a combustion engine which produces a combustion gas utilized for heat exchange in the first and second heaters.

The present invention, recognizing that heat has an effect on pressure, provides a system that operates an accumulator not only by the ingress and egress of fluid but also by the addition and removal of heat. This approach allows utilization of "low-quality" energy such as exhaust heat in addition to "high-quality" mechanical work such as from an engine output shaft or from regenerative braking. By this means, the overall efficiency of an accumulator-engine combination is improved dramatically over any similar system that cannot take advantage of exhaust heat.

DESCRIPTION OF THE PREFERRED EMBODIMENTS

Figure 2:
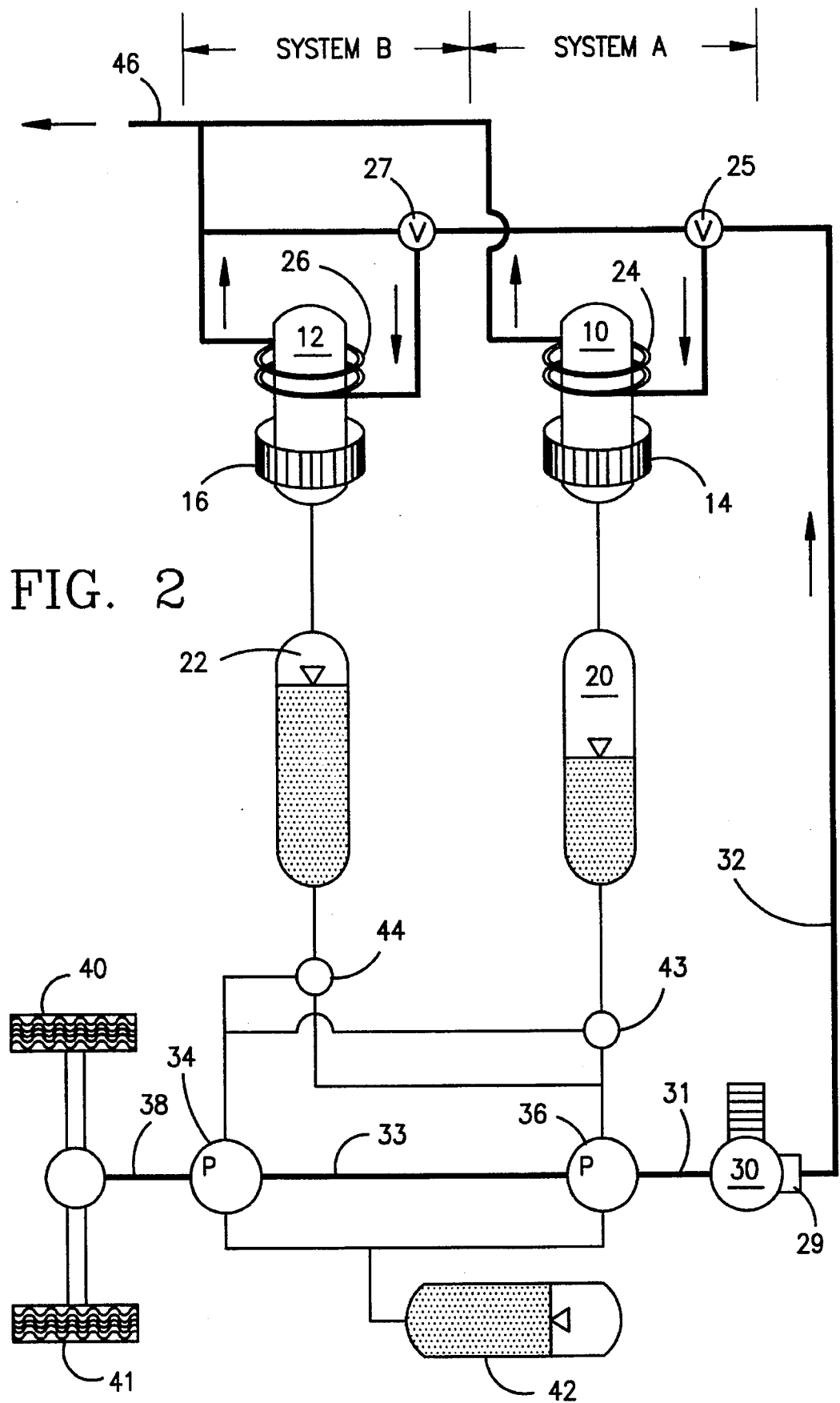
FIG. 2 is a schematic diagram of a preferred embodiment of the present invention.

FIG. 2 shows a preferred embodiment of a system of the present invention having two gas pressure vessels 10 and 12 and two primarily liquid pressure vessels 20 and 22. The gas pressure vessels 10 and 12 are selectively and alternately heated by the exhaust stream in line 32 from a small internal combustion engine 30, and then cooled by ambient air utilizing natural convection when in motion, the engine intake air flow and/or blowers 14 and 16. A hydraulic pump/motor unit 34 and a hydraulic pump unit 36 are available to charge the liquid vessels 20 and 22, with the hydraulic pump/motor unit 34 also able to be driven as a motor by fluid pressure from the vessels. The hydraulic pump 36 is driven by the output shaft 33 of the hydraulic pump/motor unit 34 acting as a motor, and/or by the output shaft 31 of the small internal combustion engine 30, depending on the mode of operation, to charge the system, while the hydraulic pump/motor 34 can be driven as a pump by motion from the drive wheels 40, 41 in regenerative braking.

Prior to and during the charge cycle of each of liquid vessels 20 and 22, its corresponding gas vessel 10 or 12 is cooled toward ambient temperature to (a) remove the residual heat of prior heating cycles before the vessel is charged again, and (b) remove the natural temperature increase that results from compression during charging. The goal is to minimize the resistance to fluid influx, which minimizes the "high quality" mechanical work necessary to return the fluid to the liquid vessel 20 or 22 while maximizing the potential for exhaust heat to be utilized in its place. Fluid influx (compression of the charge gas) terminates at a preset pressure value, after which the charge gas is heated by exhaust gases to further increase its pressure to the maximum working pressure of the gas vessel 10 or 12 (this tends to maximize the share of total stored energy that comes from exhaust heat). During discharge, the gas vessel 10 or 12 continues to be heated by exhaust gases, selectively diverted through heat exchange coils 24 and 26 by operation of gas diversion valves 25 and 27, to maintain the pressure of the gas as much as possible despite its expansion, thereby approximating an isothermal expansion and maintaining pressure at the highest level possible throughout the discharge cycle. After expansion of gas within of the first vessel 10, its cooling begins immediately while the second gas vessel 12 begins expansion and heating (heating may have taken place prior to discharge as well). In another embodiment, the second gas vessel may be heated initially by residual heat from the just-expanded first gas vessel 10, which would serve both to cool the first gas vessel 10 as well as re-use the heat from the first gas vessel 10 instead of discarding it.

Figure 1:
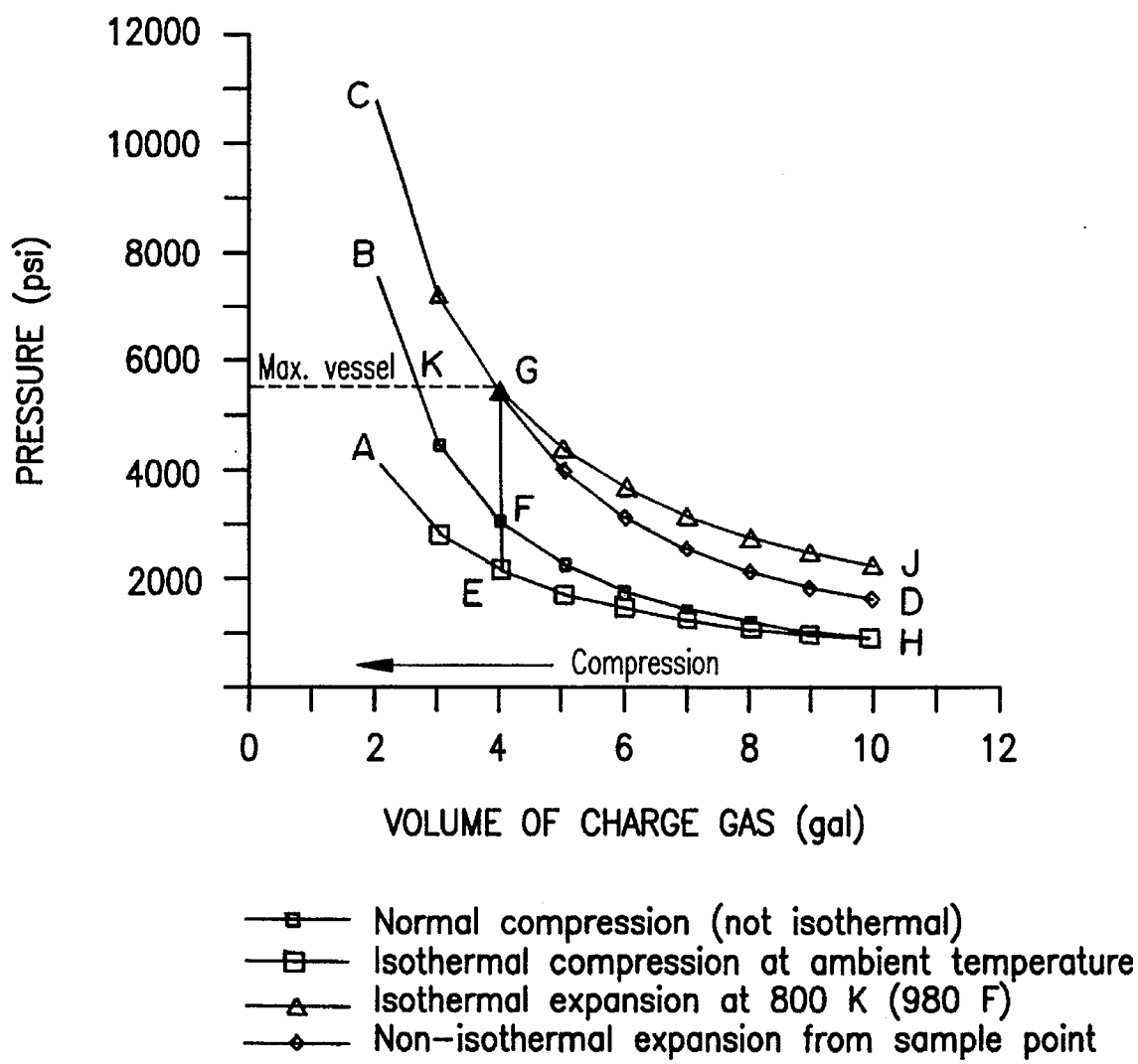
FIG. 1 is a graph of volume versus pressure for a constant mass of nitrogen gas undergoing compression and expansion.

The theory of operation will be better understood with reference to FIG. 1. Suppose that point H represents the initial state of the system. As compression begins, cooling of the charge gas causes the pressure increase to follow the isothermal curve A to point E, a preset pressure value. At this point, fluid influx ceases and exhaust heating of the charge gas begins, elevating the pressure to the maximum vessel pressure at point G. At this point the charge gas may be almost as hot as the exhaust gas (here 800° K). As discharge begins, heating is continued, causing the pressure during discharge to follow the isothermal curve C from point G to point J. After discharge, cooling takes place, which brings the temperature to ambient and the pressure to point H. In actual operation, the system can fall short of the ideal curves described here and still deliver significant improvements in efficiency beyond traditional accumulator operation. Without benefit of the present invention, the cycle would have followed curve B to the maximum vessel pressure at point K and then back down to point H. The invention modifies this curve in the following way: (a) cooling during compression causes pressure to follow curve HE instead of HFK, minimizing the amount of high-quality mechanical work thus stored; (b) heating of the compressed charge allows exhaust heat energy to be utilized in place of the mechanical work foregone in step (a), as well as ultimately increasing the total amount of energy stored; (c) continual heating during expansion causes pressure to follow curve GJ instead of the non-isothermal curve GD, allowing even more exhaust heat energy to be utilized.

Much of the energy that would normally have been supplied by mechanical shaft motion in a typical accumulator is supplied by exhaust heat, improving the fuel utilization efficiency of the system. Specifically, the charge cycle described above would require a relatively small amount of mechanical work (equal to the area under the curve HE in FIG. 1), while the rest of the energy would be provided by exhaust heat (equal to the area between curve HE and curve GJ). A conventional process would have required all mechanical work (equal to the area under the curve HFK) and would not have utilized exhaust heat at all. By optimizing volume relationships, engine size, and other components of this system, it is possible to achieve a highly efficient automotive powertrain using a very small engine and a large amount of its normally wasted exhaust heat.

Once initiated, cooling and heating are regulated in part by noting the temperature change between the inflow temperature and the outflow temperature of the cooling or heating medium. For example, in order to heat one of vessels 10 and 12, hot exhaust gas is routed to it until the temperature of exhaust gas leaving the vessel is near or equal to the exhaust gas temperature leaving the engine. Similarly, a cooling cycle would end when the outflow temperature of the cooling air is near or equal to ambient temperature. Selective routing of exhaust gases is achieved by means of valves 25, 27 in the exhaust system, which can be controlled, for example by a computer (not shown) or by temperature-sensitivity. Blowers 14 and 16 or other cooling means can be similarly controlled.

To begin the initial charge cycle, mechanical energy from the small internal combustion engine 30 travels along shaft 31 to hydraulic pump 36, which pumps fluid from the "low pressure" liquid storage vessel 42 through 3-way valve 43 into liquid pressure vessel 20, thus compressing charge gas into gas pressure vessel 10. Blower 14 directs air at ambient temperature over the outside of gas pressure vessel 10, or, alternatively, to a heat exchange device connected to or within gas pressure vessel 10, in order to remove the heat (temperature increase) that is generated in vessel 10 due to the compression. Meanwhile, exhaust gases from engine 30 travel through exhaust manifold 29 along exhaust pipe 32, through 3-way valve 25 and through 3-way valve 27 and into exterior heat exchanger 26 before exiting at the tailpipe 46. The gas in gas pressure vessel 12 is heated resulting in a pressure rise. Fluid begins discharging from liquid pressure vessel 22 through 3-way valve 44 and through pump/motor 34 (acting as a motor) into liquid storage vessel 42. Pump/motor 34 is thus driven as a motor and, in turn, drives drive wheels 40 and 41 through shaft 38.

When liquid vessel 20 reaches a filled state, two things happen: (1) 3-way valve 43 is closed, and (2) cooling of gas vessel 10 ceases and heating begins. Exhaust gases are directed through 3-way valve 25 to heat exchanger 24, imparting heat to the charge gas while spent exhaust gas exits through the tailpipe 46. The gas in gas pressure vessel 10 is heated resulting in a rise in pressure. When the fluid from liquid pressure vessel 22 is fully discharged, fluid discharge begins from liquid pressure vessel 20 through 3-way valve 43 and through pump/motor 34 (acting as a motor) into liquid storage vessel 42. Thus, in this portion of the cycle liquid from vessel 20 drives pump/motor 34 which, in turn, drives drive wheels 40 and 41. Heating stops when the pressure in vessel 10 reaches the maximum allowable pressure, until exhaust gas exiting the heat exchanger 24 is almost the same temperature as exhaust from the engine or until liquid pressure vessel 20 has fully discharged its fluid through pump/motor 34 acting as a motor. As soon as the fluid from liquid pressure vessel 22 is fully discharged, the charge/cooling cycle begins for system B as was just described for system A.

The heating/discharging of one of systems A and B while cooling/charging the other system cycles with a frequency dependent on the size (volume/pressure) of the individual systems and the power output of the internal combustion engine 30. Generally, when any liquid vessel has become fully discharged, it is immediately made ready for charging by cooling its corresponding gas vessel, removing residual heat left in the gas and gas vessel by the heating/discharging cycle. This is done by activating the appropriate blower, or other cooling means, so as to reduce the temperature of the vessel and the contained charge gas as rapidly as possible. When there are several liquid vessels (i.e., systems), another liquid vessel would be charged during the time that the "just expanded" gas vessel is being cooled, allowing additional time to achieve more cooling before charging must begin.

Energy may be delivered to the accumulator system by means of regenerative braking when it is available. Motion of wheels 40, 41 drives pump/motor 34 acting as a pump, directing fluid to any pressure vessel and charging it according to the charge/cool/heat cycle previously discussed. Wheel motion may also drive hydraulic pump 36 in place of, or in combination with, mechanical work from the engine 30.

The charging of one of the accumulator systems A and B usually occurs concurrently with discharging of the other accumulator system to help drive the vehicle. To illustrate, mechanical work from shaft 31 powers pump 36 charging liquid/gas vessels 20/10 in the manner previously described. Meanwhile, liquid/gas vessels 22/12 act to drive pump/motor 34 acting as a motor which supplies power to shaft 38. Of course, with engine 30 and pump/motor 34 attached to the same vehicle drive shaft, power to charge the liquid/gas vessels comes from a "combination" of engine 30 and pump/motor 34 acting as a motor or from either acting alone.

The foregoing embodiment can be modified in a number of respects, consistent with the present invention. For example, initial heating of a gas vessel may be achieved by using the residual heat from a just-expanded first vessel, prior to or in combination with direct heating by fresh exhaust gas as previously described in the first embodiment. Heating may also terminate prior to completion of the expansion phase. The charging phase may be terminated based on either the pressure in the vessel or the volume of liquid supplied.

Heat exchange between the exhaust gas and the gas charge of a vessel can be with an external heat exchange coil as shown in FIG. 2, with a heat exchange coil internal to the gas vessel, or in any conventional manner. Insulating the surfaces that are exposed to the gas (e.g. interior of the gas vessels) will further improve the efficiency of the system, minimizing heat transfer to and from surfaces, when using internal or external gas circulating heat exchangers.

Three or more systems may also be used to allow more efficient use of the heat energy (i.e., allow better heat utilization), but requiring a complexity/cost trade-off. The gas and liquid vessels of each system may be separate vessels as shown in FIG. 2, or may be combined into a single vessel for each system.

In other vehicular and non-vehicular embodiments of the invention, any form of heat energy may be used to power the accumulator engine, including various forms of "waste" or low temperature heat energy such as from utility power plants. Cooling during the charging phase can be supplied by ambient air, water or by other means. Solar heat may also be used for the heating/discharging phase while ambient air or other cooling means may be used during the charging phase, but radiant "night time" cooling may be the most cost effective cooling means for this application since it may be desirable to have a longer frequency cycle time. In such embodiments, the power required to drive pump 36 (see FIG. 2) comes from motor 34 through shaft 33. Net power produced by the accumulator engine is thus available through shaft 38 (e.g. to drive an electrical generator).

The prior art discharges to the ambient environment the heat this invention utilizes to provide useful work. Also, unlike conventional accumulators, this invention allows the utilization of low quality energy such as exhaust heat in "charging" the accumulator, whereas conventional accumulators can only be charged with high-quality energy such as mechanical work from an engine or regenerative braking. In combination with an internal combustion engine as the primary energy source, the invention comprises a hybrid hydraulic powertrain that is more efficient than any similar powertrain that utilizes only conventional accumulators, due to the utilization of exhaust heat. It also leads to a smaller engine size than possible with other systems, because less mechanical work is necessary for charging the accumulator and ultimately driving the vehicle, i.e., a more efficient overall thermodynamic process.

During the discharge cycle, the invention allows fluid to be maintained at a higher pressure than would normally result from a pure volume expansion of the charge gas in a conventional accumulator system. This allows more work to be delivered by the system, and increases the energy storage capacity for a given gas volume.

The gas side of the accumulator system can have a smaller volume than possible with a conventional accumulator, because energy is stored in the gas by heat transfer as well as by the traditional volume change mechanism (i.e., compression and expansion).

The systems of the present invention integrate the heating/discharging and cooling/charging thermodynamic cycle just described into the continuous operation of a heat engine thermodynamic cycle to yield a higher overall cycle efficiency. In essence, this thermodynamic cycle, either integrated or as the prime utilizer of heat energy, is believed to be a new means of employing an optimized heat engine thermodynamic cycle.

In addition, the amount of heat energy reclaimed by the present invention is maximized, by (a) limiting conventional charging (i.e., compression) to a pressure lower than the maximum pressure of the gas vessel, and then reaching maximum pressure exclusively by means of heat transfer, and (b) neutralization of compression-related temperature increases during the compression cycle by cooling of the gas vessel and the charge gas.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

We claim:

1. A pneumatic/hydraulic accumulator heat engine for providing rotating shaft power/work from any source of available heat comprising:

fluidic drive means for providing rotating shaft power;

first and second liquid tanks, connected in parallel with said fluidic drive means, for alternately (1) discharging liquid to drive said fluidic drive means and (2) receiving liquid;

a pump driven by said fluidic drive means, said first and second liquid tanks being connected in parallel to said pump;

valve switch means for directing discharge of said pump to said first liquid tank while directing discharge of liquid from said second liquid tank through said fluidic drive means and for switching to direct discharge of said first liquid tank through said fluidic drive means while directing discharge of said pump to said second liquid tank;

a first gas vessel containing a gas in fluid communication with liquid in said first liquid tank, whereby discharge of liquid from said pump into said first liquid tank compresses the gas contained in said first gas vessel;

a second gas vessel containing a gas in fluid communication with liquid in said second liquid tank, whereby discharge of liquid from said pump into said second liquid tank compresses the gas contained in said second gas vessel;

first and second heating means for heating, respectively, the gas in said first and second gas vessels;

first and second cooling means for cooling, respectively, the gas in said first and second gas vessels; and control means for operating said first heating means to heat the gas in said first gas vessel, to expand the gas contained therein to displace liquid from said first liquid tank, while operating said second cooling means to cool the gas in second gas vessel during compression of the gas contained therein by liquid pumped into said second liquid tank and for switching operation of said first and second cooling means and said first and second heating means to cool the gas in said first gas vessel while heating the gas in said second gas vessel.

2. A hydropneumatic powertrain for driving drive wheels of a vehicle comprising:

fluidic drive means for driving the drive wheels in a motor mode;

first and second liquid tanks, connected in parallel with said fluidic drive means, for alternately (1) discharging liquid to drive said fluidic drive means and (2) receiving liquid;

a prime mover;

a pump driven by said fluidic drive means and/or by said prime mover, said first and second liquid tanks being connected in parallel to said pump;

valve switch means for directing discharge of said pump to said first liquid tank while directing discharge of liquid from said second liquid tank through said fluidic drive means and for switching to direct discharge of said first liquid tank through said fluidic drive means while directing discharge of said pump to said second liquid tank;

a first gas vessel containing a gas in fluid communication with liquid in said first liquid tank, whereby discharge of liquid from said pump into said first liquid tank compresses the gas contained in said first gas vessel;

a second gas vessel containing a gas in fluid communication with liquid in said second liquid tank, whereby discharge of liquid from said pump into said second liquid tank compresses the gas contained in said second gas vessel;

first and second heating means for heating, respectively, the gas in said first and second gas vessels;

first and second cooling means for cooling, respectively, the gas in said first and second gas vessels; and control means for operating said first heating means to heat the gas in said first gas vessel, to expand the gas contained therein to displace liquid from said first liquid tank, while operating said second cooling means to cool the gas in second gas vessel during compression of the gas contained therein by liquid pumped into said second liquid tank and for switching operation of said first and second cooling means and said first and second heating means to cool the gas in said first gas vessel while heating the gas in said second gas vessel.

3. A hydropneumatic powertrain in accordance with claim 2 wherein said prime mover is a combustion engine which produces an exhaust gas, and wherein said first and second heating means are first and second heat exchangers for exchanging the heat of said exhaust gas with the gas contained in said first and second gas vessels.

4. A hydropneumatic powertrain in accordance with claim 3 further comprising an exhaust pipe and piping connecting said first and second heat exchangers in parallel between said combustion engine and said exhaust pipe and wherein said control means switches said exhaust gas between said first and second heat exchangers.

5. A hydropneumatic powertrain in accordance with claim 2 wherein said fluidic drive means is reversible whereby, in a pump mode, said fluidic drive means operates as a pump to pump liquid into said first and second liquid tanks, said fluidic drive means in said pump mode being driven by said prime mover or, in regenerative braking, by said drive wheels.

6. A hydropneumatic powertrain in accordance with claim 2 wherein said first and second cooling means are first and second blowers.

7. A hydropneumatic powertrain in accordance with claim 6 wherein said blowers have an annular configuration for contacting the entire circumferences of the respective gas vessels with flows of cooling air.

8. A hydropneumatic powertrain in accordance with claim 6 wherein said blowers are switched between said first and second heat exchangers with flows of cooling air.

* * * * *